United States Patent
Schwiesow

(10) Patent No.: US 11,861,870 B2
(45) Date of Patent: Jan. 2, 2024

(54) RAPID OBJECT DETECTION FOR VEHICLE SITUATIONAL AWARENESS

(71) Applicant: The Boeing Company, Chicago, IL (US)

(72) Inventor: Michael B. Schwiesow, Madison, AL (US)

(73) Assignee: The Boeing Company, Chicago, IL (US)

(*) Notice: Subject to any disclaimer, the term of this patent is extended or adjusted under 35 U.S.C. 154(b) by 148 days.

(21) Appl. No.: 17/384,230

(22) Filed: Jul. 23, 2021

(65) Prior Publication Data
US 2023/0129093 A1   Apr. 27, 2023

(51) Int. Cl.
*G06V 10/762* (2022.01)
*G05D 1/10* (2006.01)
*B64U 20/87* (2023.01)

(52) U.S. Cl.
CPC .......... *G06V 10/762* (2022.01); *B64U 20/87* (2023.01); *G05D 1/106* (2019.05); *B64U 2201/10* (2023.01)

(58) Field of Classification Search
CPC .... G06V 10/762; G06V 10/761; G06V 20/56; G06V 10/763; B64U 20/87; B64U 2201/10; G05D 1/106
USPC ......................................................... 382/225
See application file for complete search history.

(56) References Cited

U.S. PATENT DOCUMENTS

| | | | | |
|---|---|---|---|---|
| 5,978,794 A | * | 11/1999 | Agrawal | G06F 16/2246 |
| 2015/0036945 A1 | * | 2/2015 | Zuliani | G06T 5/005 |
| | | | | 382/266 |
| 2020/0320339 A1 | | 10/2020 | Rawashdeh | |

FOREIGN PATENT DOCUMENTS

| | | | | |
|---|---|---|---|---|
| CN | 112847343 | * | 5/2021 | |
| CN | 113010759 | * | 6/2021 | |
| EP | 0913780 | * | 5/1999 | G06F 17/30 |
| WO | 2020154967 A1 | | 8/2020 | |

OTHER PUBLICATIONS

Pagnuco, I., et al. Analysis of genetic association using hierarchical clustering and cluster validation indices. Genomics 109 (2017), Elsevier, pp. 438-445. <DOI: 10.1016/j.ygeno.2017.06.009>.

(Continued)

*Primary Examiner* — Jerome Grant, II
(74) *Attorney, Agent, or Firm* — Quinn IP Law

(57) ABSTRACT

A method is provided that includes receiving points of an image in which objects are depicted. The method includes performing a greedy nearest-neighbor (GNN) cluster analysis of the image to group the points of the image. The GNN cluster analysis includes grouping the points into a plurality of local GNN clusters, from a greedy analysis using a k-d tree in which the points are organized. The plurality of local GNN clusters are then extended into a plurality of global GNN clusters. This evaluating similarity of the local GNN clusters, merging the local GNN clusters into a global GNN cluster when each of the defined similarity criteria is evaluated to true, and passing the local GNN clusters as global GNN clusters when any of the defined similarity criteria is evaluated to false. The method then includes detecting the objects depicted in the image based on the global GNN clusters.

21 Claims, 12 Drawing Sheets

(56) References Cited

OTHER PUBLICATIONS

Zhang, T., et al. BIRCH: An Efficient Data Clustering Method for Very Large Databases. Sigmod. Montreal, Canada, 1996. pp. 103-114.

Wagstaff, K., et al. Constrained K-means Clustering with Background Knowledge. International Conference on Machine Learning, 2001. 8 pages.

Ester, M., et al. A Density-Based Algorithm for Discovering Clusters, a Density-Based Algorithm for Discovering Clusters in Large Spatial Databases with Noise. Proceedings of the 2nd International Conference on Knowledge Discovery and Data Mining, Munich, Germany, 1996. 6 pages.

Ioannou, Y., et al. Difference of Normals as a Multi-Scale Operator in Unorganized Point Clouds. Computer Vision and Pattern Recognition, Montreal, Canada, Sep. 8, 2012. 9 pages <arXiv: 1209.1759vl>.

Day, W., et al. Efficient Algorithms for Agglomerative Hierarchical Clustering Methods. Journal of Classification, vol. 1, Issue 1, Dec. 1984. 18 pages.

Gil-Garcia, R., et al. A General Framework for Agglomerative Hierarchical Clustering Algorithms. Proceedings from the 18th International Conference on Pattern Recognition, IEEE, 2006, pp. 1-4.

McInnes, L., et al. hdbscan: Hierarchical density based clustering. Journal of Open Source Software, 2017, 2 pages. <DOI: 10.21105/joss.00205>.

Bien, J., & Tibshirani, R. Hierarchical Clustering with Prototypes via Minimax Linkage. J Am Stat Assoc. 2011; 106(495): 1075-1084, pp. 1-26.

Ward, J. Hierarchical Grouping to Optimize an Objective Function. Journal of the American Statistical Association, 58:301, Mar. 1963, pp. 236-244. <DOI: 10.1080/01621459.1963.10500845>.

Ding, C., et al. K-means Clustering via Principal Component Analysis. Proceedings of the 21st International Conference on Machine Learning, Banff, Canada, 2004. 8 pages.

Comaniciu, D., et al. Mean Shift: A Robust Approach Toward Feature Space Analysis. IEEE Transactions on Pattern Analysis and Machine Intelligence, vol. 24, No. 5, May 2002, pp. 603-619.

Golovinskiy, A., et al. Min-Cut Based Segmentation of Point Clouds. IEEE Workshop on Search in 3D and Video, Sep. 2009, 8 pages.

Banfield, J., et al. Model-Based Gaussian and Non-Guassian Clustering. Biometrics, vol. 49, No. 3, Sep. 1993, pp. 803-821. Retrieved from the Internet <URL: https://www.jstor.org/stable/2532201>.

Bentley, J. Multidimensional Binary Search Trees Used for Associative Searching. Communications of the Association of Computing Machinery, vol. 18, No. 9, 1975, pp. 509-517.

Ankerst, M., et al. OPTICS: Ordering Points to Identify the Clustering Structure. Proceedings of the International Conference on Management of Data, Philadelphia, PA, vol. 28, No. 2, 1999, 12 pages.

Maugis, C., et al. Variable Selection for Clustering with Gaussian Mixture Models. [Research Report] RR-6211, Inria, 2007, 39 pages. Retrieved from the Internet <URL: https://hal.inha.fr/inria-00153057v2>.

Rusu, R. Semantic 3D Object Maps for Everyday Manipulation in Human Living Environments. Technische Universitat Munchen, 2009. 284 pages.

Region growing segmentation. Point Cloud Library. Retrieved from the Internet <URL: https://pcl.readthedocs.io/projects/tutorials/en/latest/region_growing_segmentation.html> on Apr. 1, 2021.

Clustering. Scikit-learn, Machine Learning in Python. Retrieved from the Internet <URL: https://scikit-learn.org/stable/modules/clustering.html#clustering> on Apr. 1, 2021.

Segmentation tutorials. Point Cloud Library. Retrieved from the Internet <URL: , http://pointclouds.org/documentation/tutorials/#segmentation-tutorial> on Apr. 1, 2021.

Suau, X. et al.; article entitled: Real-Time Head and Hand Tracking Based on 2.5D Data; IEEE Transactions On Multimedia; IEEE; Jun. 2012; pp. 575-585; vol. 14, No. 3.

Zhengyang, S. et al.; article entitled: An Improved Lidar Data Segmentation Algorithm Based on Euclidean Clustering; Microelectronics, Electromagnetics and Telecommunications : Proceedings of ICMEET 2017; Jan. 2020; pp. 1119-1130; vol. 582; Retrieved from the Internet: URL: http://link.springer.com/content/ pdf/10.1007/978-981-15-0474-7_105; Springer Nature Singapore Pte Ltd. 2020, R. Wang et al., Proceedings of the 11th International Conference on Modelling, Identification and Control, lecture notes in electrical engineering 582,.

* cited by examiner

908 ⟶

928 — MERGE PAIRS OF THE LOCAL GNN CLUSTERS WHEN EACH OF THE DEFINED SIMILARITY CRITERIA IS EVALUATED TRUE, AND THEREBY PRODUCING A SET OF MERGED PAIRS OF LOCAL GNN CLUSTERS

930 — ITERATE THROUGH THE SET OF MERGED PAIRS TO FURTHER MERGE ANY INTERSECTING PAIR OF THE MERGED PAIRS INTO A RESPECTIVE GLOBAL GNN CLUSTER

FIG. 9D

932 — PERFORM SITUATIONAL AWARENESS OF THE ROBOT BASED ON THE OBJECTS AS DETECTED

934 — CAUSE THE ROBOT TO EXECUTE MANEUVERS IN THE ENVIRONMENT BASED ON THE SITUATIONAL AWARENESS

FIG. 9E

RAPID OBJECT DETECTION FOR VEHICLE SITUATIONAL AWARENESS

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control, and object detection may be considered an enabling technology. In this regard, object detection generally involves extracting and condensing information from sensor input into detected objects that can be passed to a tracking system for estimation refinement, memory retention, and prediction. Many object detection techniques involve cluster analysis in which points of an image that belong together are grouped.

There are a number of existing clustering techniques, and these techniques fall into several broad categories. Hierarchical clustering techniques build a dendrogram tree structure using a distance metric and linkage criterion, and clusters are determined by the resulting tree structure at a cutoff location. These techniques are often applied in medical research and for document clustering, however they do not scale well enough to large datasets to produce detections fast enough for autonomous robots.

Density based clustering algorithms are concerned with forming clusters in regions of point concentration. These algorithms are for the most part faster than hierarchical clustering techniques, but they still do not detect objects fast enough for autonomous robots except in very sparse environments. Other cluster analysis techniques include distribution-based clustering schemes, hybrid algorithms, segmentation techniques, flood fill/region growing techniques, and variants on K-means clustering. The only one of these with the speed potential for autonomous robot use is K-means; however, K-means requires a priori knowledge of the number of clusters which makes it unsuitable for autonomous robots.

It would therefore be desirable to have a system and method that takes into account at least some of the issues discussed above, as well as other possible issues.

BRIEF SUMMARY

Example implementations of the present disclosure relates generally to robotics and, in particular, to one or more of the design, construction, operation or use of autonomous robots such as autonomous or semi-autonomous vehicles. Example implementations perform object detection with cluster analysis according to a greedy nearest neighbor (GNN) technique that is capable of performing fast clustering on large, unsorted datasets without a priori knowledge of the number of available clusters. The present disclosure more particularly includes, without limitation, the following example implementations.

Some example implementations provide a vehicle comprising an imager configured to convey information from which an image of an ambient environment is generated, the information including points of the image that are spatially arranged to represent objects depicted in the image, the points corresponding to pixels of a digital image, or data points of a point cloud; and a mission management system (MMS) configured to at least: receive the points of the image; perform a greedy nearest-neighbor (GNN) cluster analysis of the image to group the points of the image, the GNN cluster analysis including the MMS configured to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

Some example implementations provide an apparatus comprising a memory configured to store computer-readable program code; and processing circuitry configured to access the memory, and execute the computer-readable program code to cause the apparatus to at least: receive points of an image that are spatially arranged to represent objects depicted in the image, the points corresponding to pixels of a digital image, or data points of a point cloud; perform a greedy nearest-neighbor (GNN) cluster analysis of the image to group the points of the image, the GNN cluster analysis including the apparatus caused to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

Some example implementations provide a method receiving points of an image that are spatially arranged to represent objects depicted in the image, the points corresponding to pixels of a digital image, or data points of a point cloud; performing a greedy nearest-neighbor (GNN) cluster analysis of the image to group the points of the image, the GNN cluster analysis including: grouping the points into a plurality of local GNN clusters, from a greedy analysis of the points using a k-d tree in which the points are organized in a k-dimensional space; and extending the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detecting the objects depicted in the image based on the global GNN clusters.

Some example implementations provide a computer-readable storage medium that is non-transitory and has computer-readable program code stored therein that, in response to execution by processing circuitry, causes an apparatus to at least receive points of an image that are spatially arranged to represent objects depicted in the image, the points corresponding to pixels of a digital image, or data points of a point cloud; perform a greedy nearest-neighbor (GNN) cluster analysis of the image to group the points of the image, the GNN cluster analysis including the apparatus caused to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 9A, 9B, 9C, 9D and 9E are flowcharts illustrating various steps in a method, according to example implementations.

DETAILED DESCRIPTION

Figure 1:
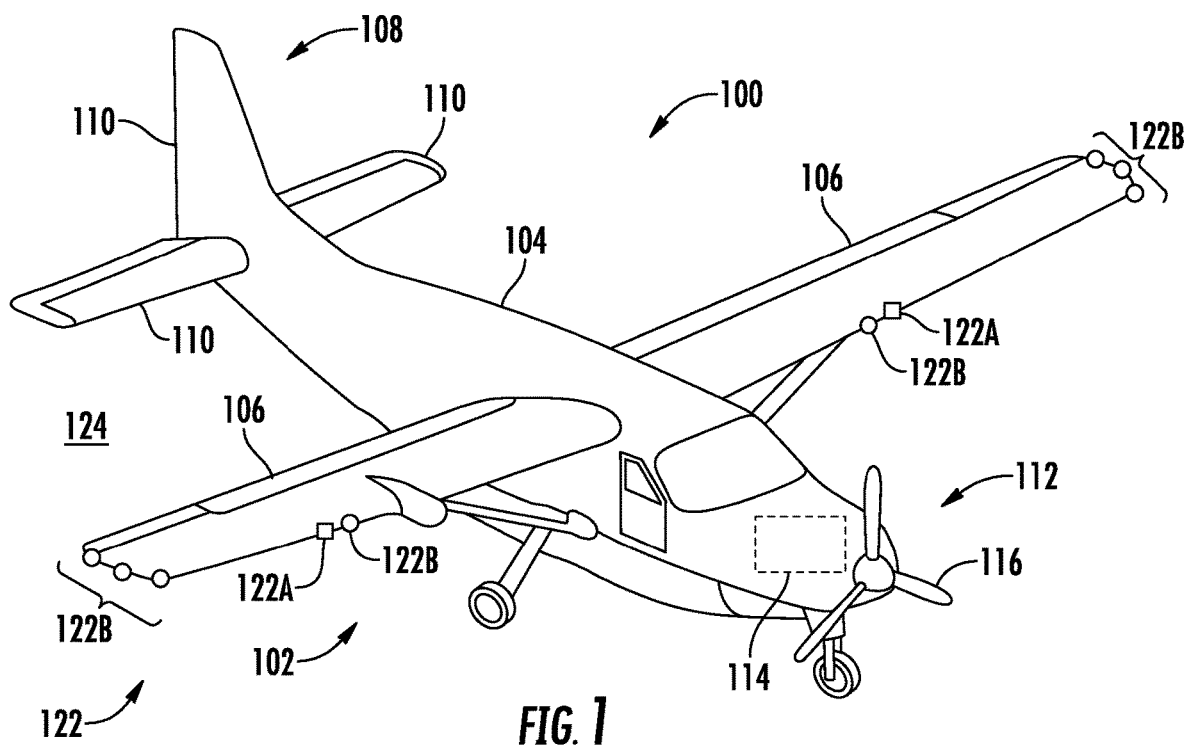
FIG. 1 illustrates one type of robot, namely, a vehicle, that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its ambient environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot may be implemented as a vehicle in that the robot is a machine designed as an instrument of conveyance by land, water or air. A robot designed and configurable to fly may at times be referred to as an aerial robot, an aerial vehicle, an aircraft or the like. A robot designed and configurable to operate with at least some level of autonomy may at times be referred to as an autonomous robot, or an autonomous aerial robot, autonomous aerial vehicle or autonomous aircraft in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

A robot designed as a vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

The vehicle may also include any of a number of different subsystems (each an individual system) for performing one or more functions or operations. In particular, for example, the vehicle may include a mission management system (MMS) configured to manage missions of the vehicle. A mission is a deployment of the vehicle to achieve one or more mission objectives. A mission may be decomposed into maneuvers of the vehicle with optional sensor and/or effector scheduling, and the MMS may execute tasks to manage the vehicle to execute maneuvers with specific parameters and capabilities. The MMS may include subsystems to process sensor data to situational awareness, plan tasks for the vehicle, and execute the tasks. The MMS may also be configured to interface with a vehicle management system, and in some examples a control station located remote from the vehicle. In various examples, the MMS may be located onboard the vehicle, at the control station, or distributed between the vehicle and the control station.

FIG. 1 illustrates one type of vehicle 100, namely, an aircraft, that may benefit from example implementations of the present disclosure. As shown, the vehicle generally includes a basic structure 102 with an airframe including a fuselage 104, and one or more pairs of wings 106 that extend from opposing sides of the fuselage. The airframe also includes an empennage or tail assembly 108 at a rear end of the fuselage, and the tail assembly includes stabilizers 110. The vehicle further includes a propulsion system 112 with an engine 114 configured to power a propulsor 116 to generate propulsive forces that cause the vehicle to move. On the vehicle as shown, the propulsor is a propeller. Depending on the vehicle, in various examples, the propulsors include one or more of rotors, propellers, jet engines or wheels.

As described below, the vehicle 100 includes a number of other systems and sensors. As shown in FIG. 1, for example, the vehicle includes one or more imagers 122 configured to convey (or in some examples detect and convey) information from which an image of an ambient environment 124 of the robot is generated. In some examples, this information includes points of the image that are spatially arranged to represent objects depicted in the image, the points corresponding to pixels of a digital image, or data points of a point cloud. The imager 122 may employ any of a number of different technologies such as acoustics, radio, optics and the like. More particular examples of suitable imagers include those employing radar, lidar 122A, infrared sensors, cameras 122B and the like.

Figure 2:
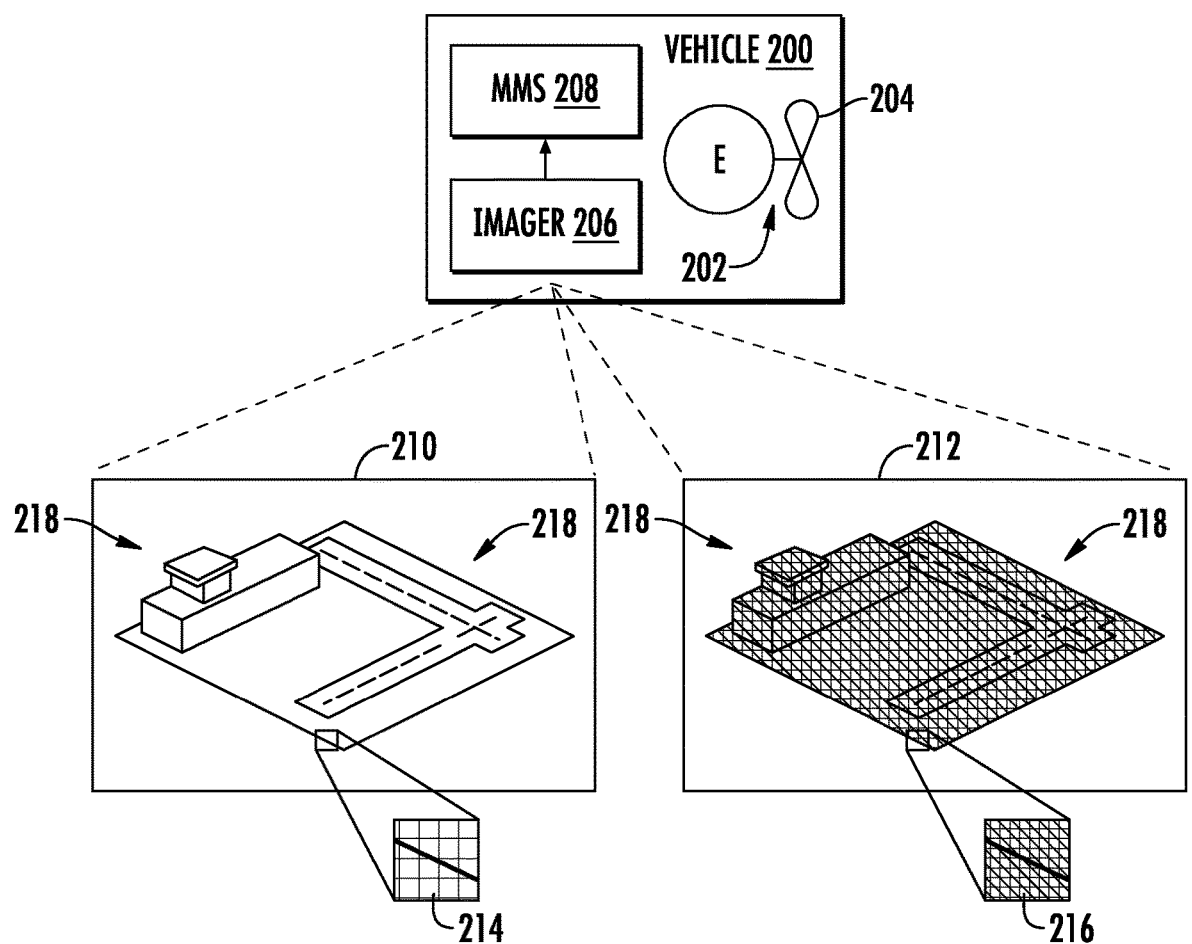
FIG. 2 is a functional block diagram of a vehicle that may correspond to the vehicle of FIG. 1, according to some example implementations.

FIG. 2 is a functional block diagram of a vehicle 200 that in some examples corresponds to the vehicle 100 of FIG. 1. According to example implementations, the vehicle may include any of a number of different subsystems (each an individual system) for performing one or more functions or operations. In particular, for example, the vehicle may include a propulsion system 202 configured to power one or more propulsors 204 to generate propulsive forces that cause the vehicle to move and thereby execute maneuvers in an ambient environment 124.

The vehicle 200 includes at least one imager 206 (e.g., imager 122) and a MMS 208. The imager 206 is configured to convey (or in some examples detect and convey) information from which an image 210, 212 of an ambient environment (e.g., ambient environment 124) of the vehicle is generated. The information includes points 214, 216 of the image that are spatially arranged to represent objects 218 depicted in the image, the points corresponding to pixels 214 of a digital image 210, or data points 216 of a point cloud 212. The MMS is configured to detect the objects depicted in the image, and manage the vehicle to execute the maneuvers in the ambient environment based on the objects as depicted.

In some examples, the MMS 208 is configured to receive the points 214, 216 of the image 210, 212, and perform a greedy nearest-neighbor (GNN) cluster analysis of the image to group the points of the image. The GNN cluster analysis includes the MMS configured to group the points into a plurality of local GNN clusters, from a greedy analysis of the points using a k-d tree in which the points are organized in a k-dimensional space. As is known in the art, a k-d tree (e.g., a k-dimensional tree) is a space-partitioning data structure for organizing points in a k-dimensional space. The analysis is greedy in that it produces a locally optimal solution at each stage; and while the locally optimal solutions may approximate a globally optimal solution in a shorter amount of time, the locally optimal solutions may not be globally optimal.

The MMS 208 is configured to extend the plurality of local GNN clusters into a plurality of global GNN clusters. This includes for a pair of local GNN clusters, applying the pair to nested conditions by which similarity of the local GNN clusters is evaluated according to defined similarity criteria. The local GNN clusters are merged into a global GNN cluster when each of the defined similarity criteria is evaluated to true, and passed as global GNN clusters when any of the defined similarity criteria is evaluated to false.

The MMS is then configured to detect the objects 218 depicted in the image 210, 212 based on the global GNN clusters.

In some examples, the MMS 208 configured to group the points 214, 216 into the plurality of local GNN clusters includes the MMS configured to at least generate the k-d tree to organize the points in a k-dimensional space. The MMS is configured to add the points to a data queue, and iterate through the points in the data queue to group the points into the plurality of local GNN clusters.

In some further examples, the MMS 208 configured to iterate through the points in the data queue includes for an iteration of a plurality of iterations, the MMS configured to select a point from the data queue as a test point. The MMS is configured to perform a radius nearest neighbor search of the test point in the k-d tree to generate a cluster of points. The MMS is configured to test the cluster against a set of clusters to identify any existing cluster in the set with at least one point in common with the cluster; and add the cluster to the set as a new cluster, or merged with the existing cluster when identified. The MMS is configured to then remove the points of the cluster from the data queue.

In some examples, the nested conditions include a first condition by which circumscribing hyperspheres of the local GNN clusters of the pair are evaluated to determine if a distance between the circumscribing hyperspheres is less than or equal to a distance threshold.

In some further examples, the nested conditions include a second condition by which a point in a first of the local GNN clusters that is closest to a centroid of a second of the local GNN clusters is evaluated to determine if the point is within a threshold distance of the centroid. The nested conditions of these examples also include a third condition by which a minimum distance between the point in the first of the local GNN clusters and respective points in the second of the local GNN clusters is evaluated to determine if the minimum distance is less than the threshold distance.

In some examples, the MMS 208 configured to extend the plurality of local GNN clusters includes the MMS configured to merge pairs of the local GNN clusters when each of the defined similarity criteria is evaluated true, and thereby produce a set of merged pairs of local GNN clusters. The MMS is configured to then iterate through the set of merged pairs to further merge any intersecting pair of the merged pairs into a respective global GNN cluster.

As indicated above, again, the image 210, 212 in some examples depicts the objects 218 in the ambient environment of the vehicle 200. In some of these examples, the MMS 208 is further configured perform situational awareness of the vehicle based on the objects as detected, and cause the vehicle to execute maneuvers in the ambient environment based on the situational awareness. This may include the MMS configured to send one or more maneuver commands to a vehicle management system (VMS) to control the vehicle to follow the maneuver commands.

To further illustrate example implementations of the present disclosure, reference is now made to FIGS. 3-7 that illustrate GNN cluster analysis of points of an image, according to various example implementations of the present disclosure. The analysis is greedy in the sense that consumes, within a single cluster, all points within a radius, $R_{nn}$, of any point that is already a member of the cluster.

The GNN cluster analysis may include generating a k-d tree on the points to cluster, $P_{kd}$, using some distance measure, $f_D$. This allows for extremely fast nearest neighbor searches. A set of empty clusters, C={ }, is initialized, and all of the points are placed into a processing queue, $Q_p$. A first point in the queue ($Q_{p1}$) is selected as a test point, $T_p$, and a radius nearest neighbor search is performed on all points in the k-d tree (including $T_p$) to generate a new cluster $C_{new} \in P_{kd} \ni f_D(T_p, P_{kd}) \leq R_{nn}$.

Figure 3:
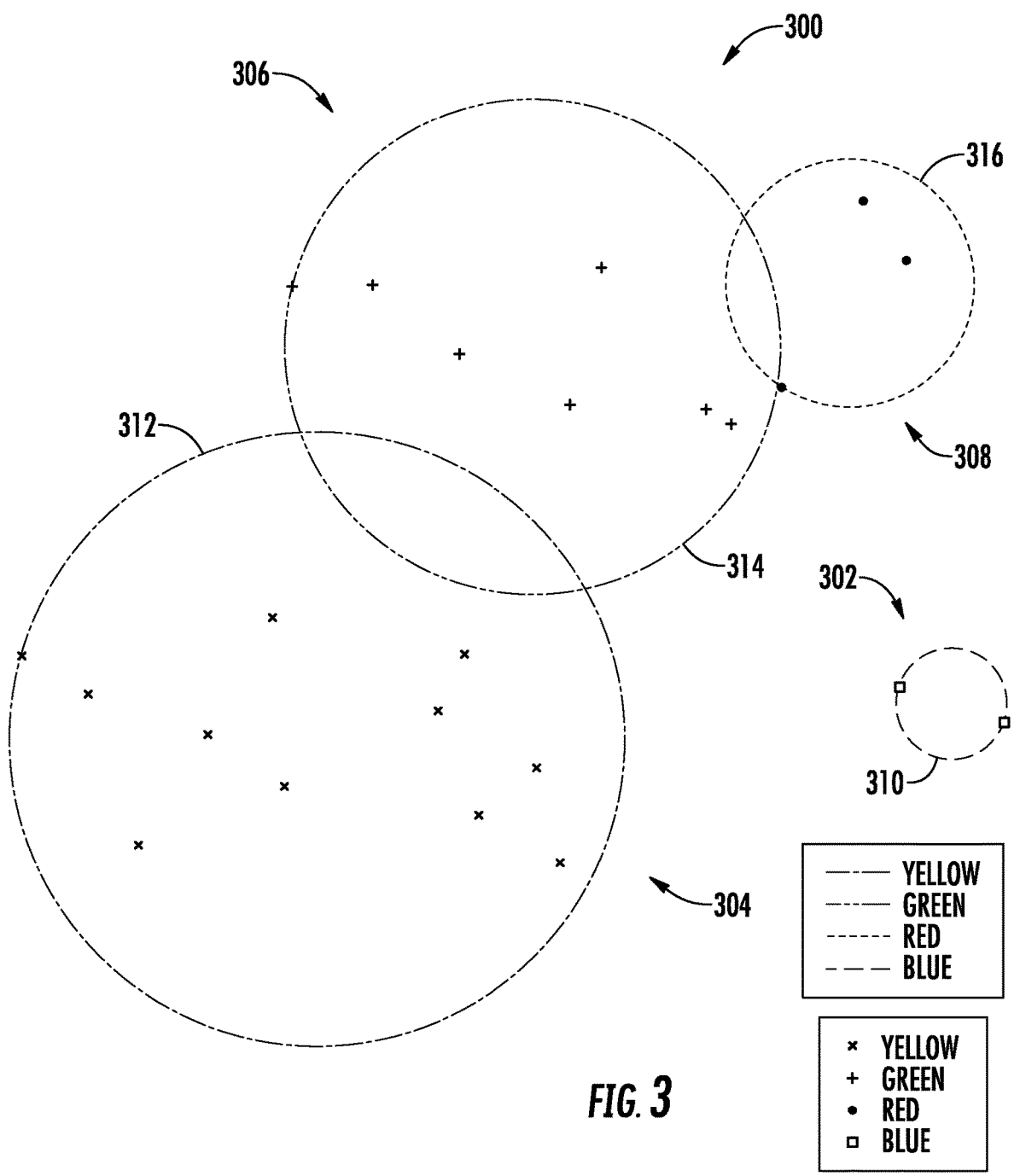
FIGS. 3, 4, 5, 6 and 7 illustrate greedy nearest neighbor (GNN) cluster analysis of points of an image, according to various example implementations.

Then, $C_{new}$ is tested against any existing clusters in C to see if it shares any points (and can therefore be merged). If $C_{new} \cap C_i = \emptyset \forall C_i \in C$, a new cluster is created and added to C, C={C, $C_{new}$}; otherwise, $C_{new}$ is combined with the first cluster with which $C_{new}$ shares a common point. All of the points in $C_{new}$ are then marked as used and removed from $Q_p$. The above steps are repeated until $Q_p$ is empty (all points assigned to a cluster). At this point, C is a set of local, greedy nearest neighbor clusters. FIG. 3 illustrates a number of points 300 grouped into four clusters 302, 304, 306 and 308 that are shown with their respective circumscribing hyperspheres 310, 312, 314 and 316. This approach allows the MMS 208 to quickly form a base set of clusters while only processing a fraction of the points. For small clouds of less than 1,000 points, to medium clouds of less than 10,000, and even large clouds of over 10,000 points, the MMS may be used to form a base set of less than 300 clusters, while processing less than 10% of the points.

As the GNN cluster analysis here only utilizes previously unassigned points to generate new clusters, it is quite likely that one or more of these local clusters may still be merged to obtain a global list of greedy nearest neighbor clusters. This is described in greater detail below with respect to clusters 306 and 308.

Figure 4:
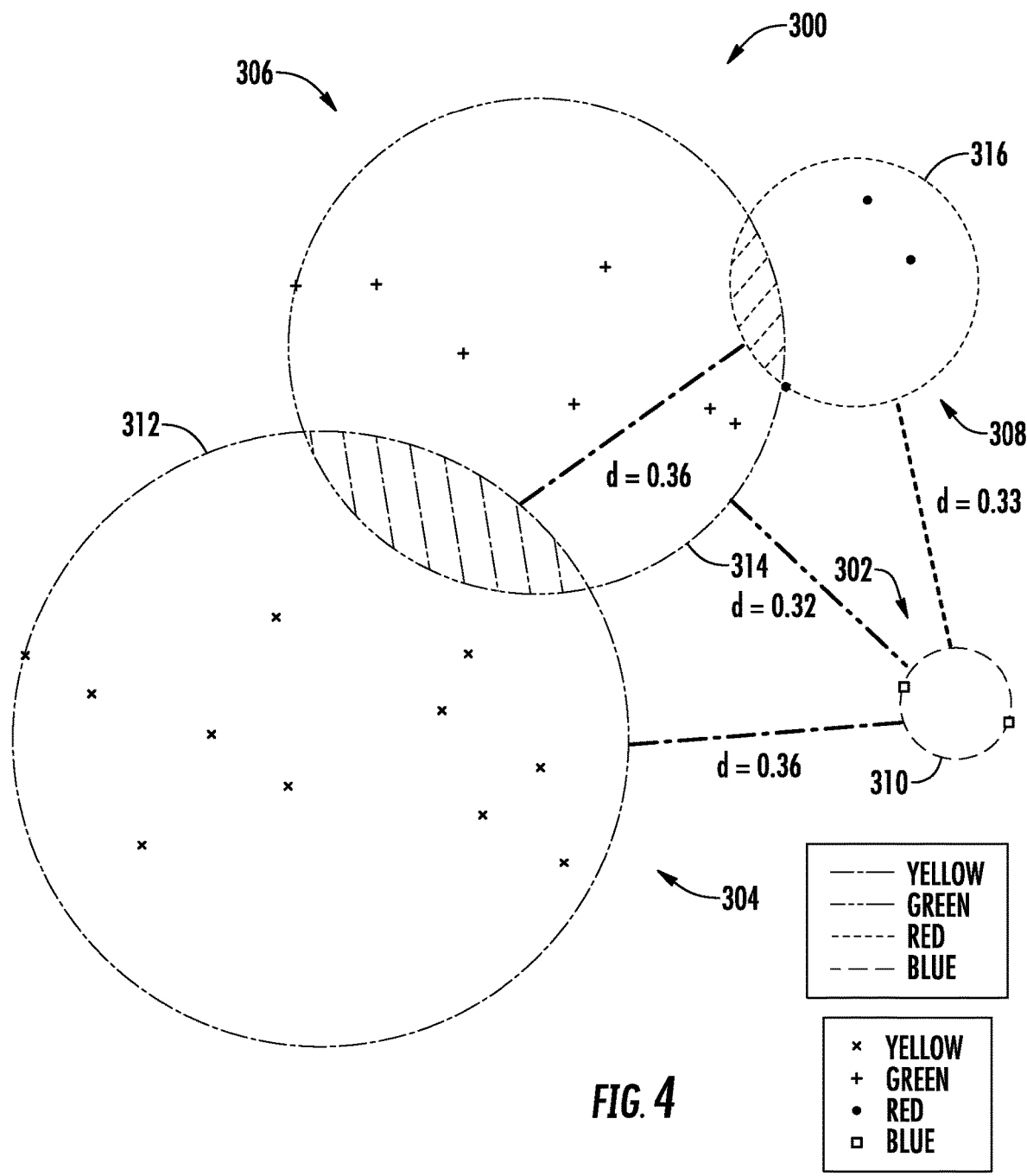

The MMS 208 may efficiently extend the local GNN clusters into global GNN clusters in the following manner. The MMS may compute the centroid of each cluster, $A_{ci}$; and using the centroid as the center, determine the radius of the circumscribing hypersphere, $R_{ci}$. For each pair of clusters, $C_{ij} = \{C_i, C_j\}$, $C_i, C_j \in C$, $D_{ij} = f_D(A_{ci}, A_{cj}) - R_{ci} - R_{cj}$ may be computed, and $I_{pairs} = \{\forall C_{ij}\} \ni D_{ij} \leq 0$ may be found. As shown in FIG. 4, for example, cluster 302 is distinct from the other local clusters 304, 306 and 308 in that the distance d between its circumscribing hypersphere 310 and the other circumscribing hyperspheres 312, 314 and 316 is greater than a distance threshold (e.g., 0.25). This cluster 302 can therefore be immediately promoted to a global GNN cluster. The other local clusters may need further processing to extend the them into global GNN clusters.

Figure 5:
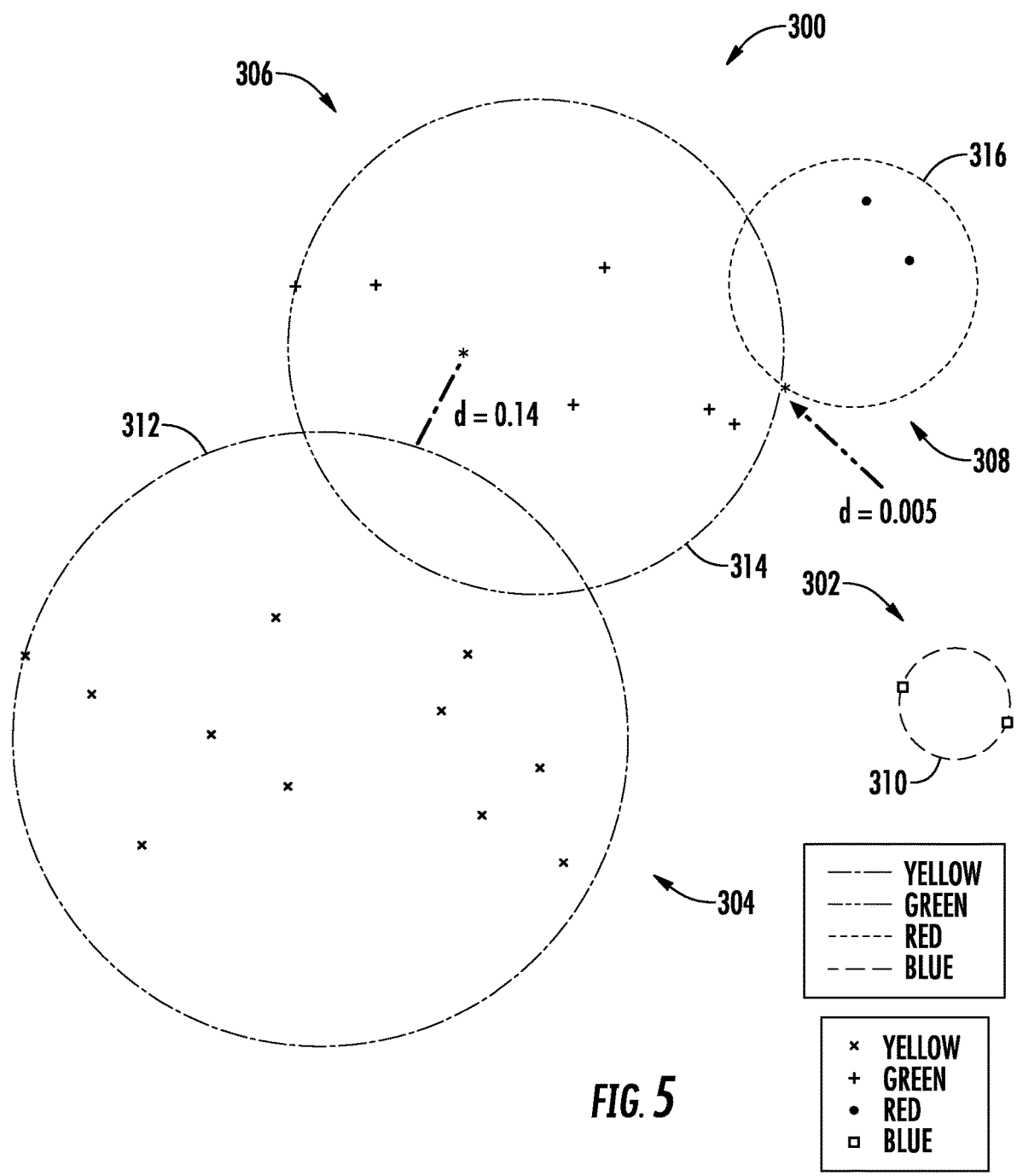
Figure 6:
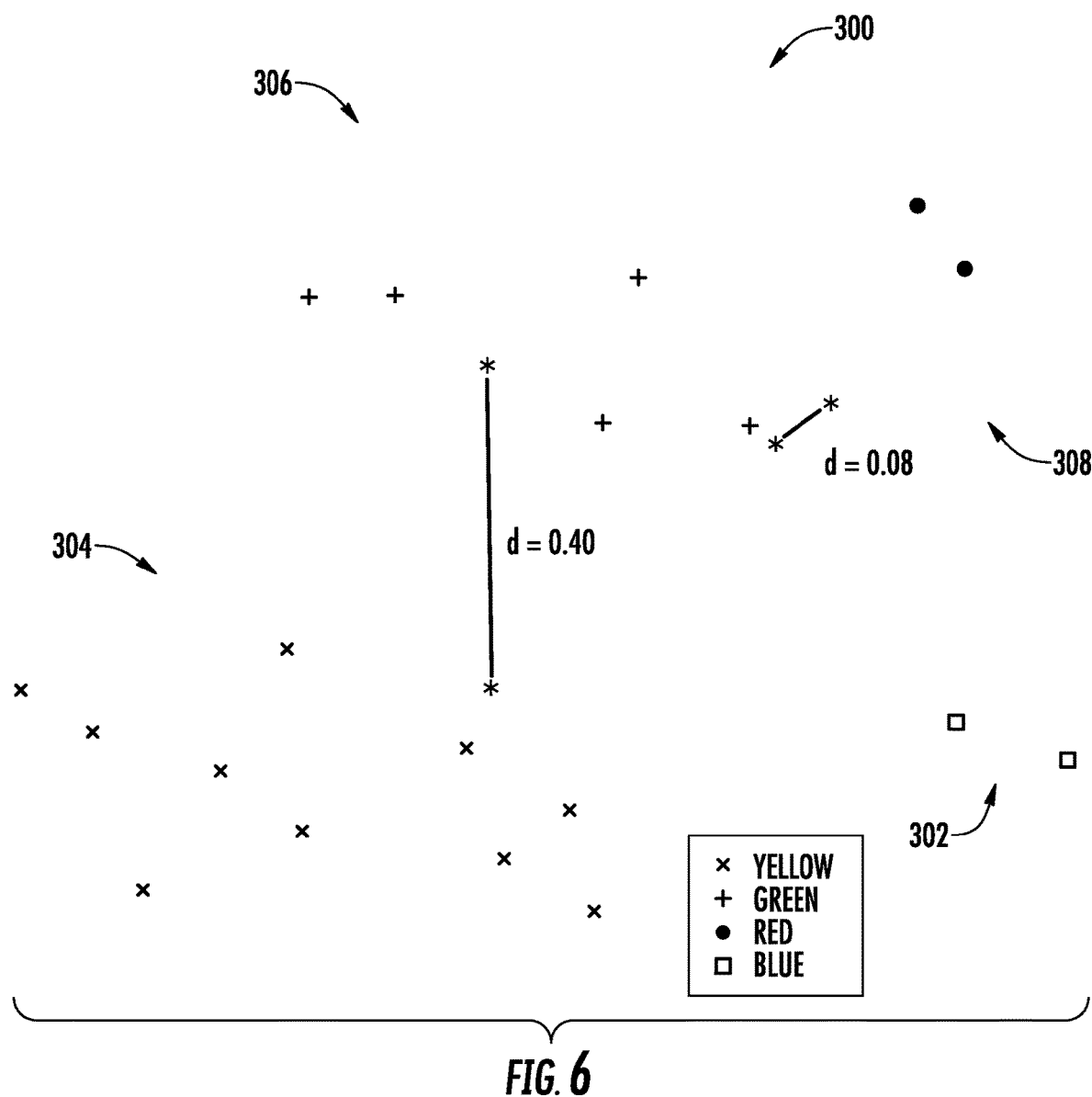
Figure 7:
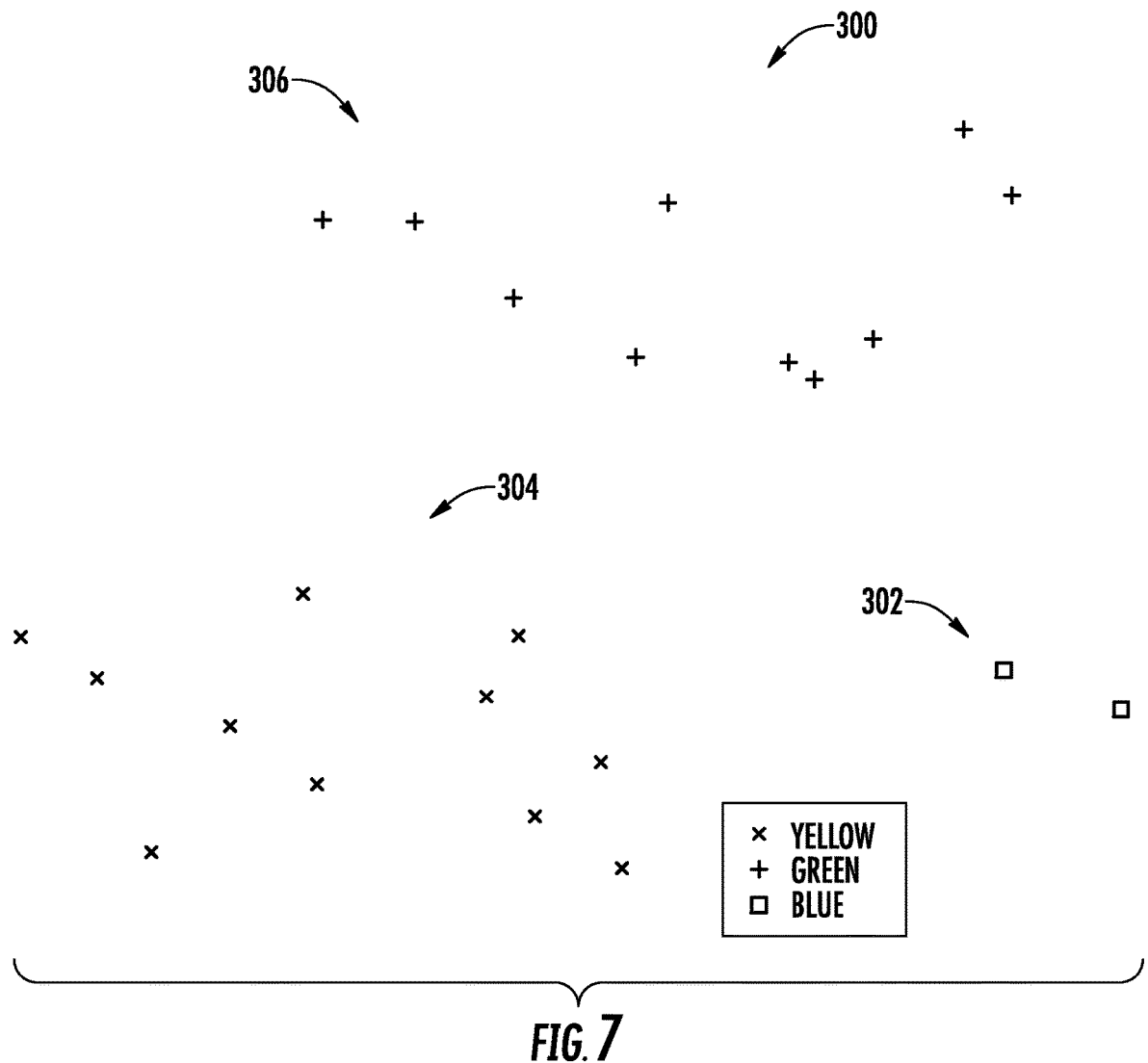

To further process the local clusters, for each pair of clusters $C_{kl} = \{C_k, C_l\}$, $\in I_{pairs}$, find the point in cluster $C_l$ which is closest to the center of cluster $C_{kl} = P_{lk} = C_{lj} \ni D_{ij} = \min_j (f_D(A_{ck}, C_{lj}) - R_{ck})$. This is shown in FIG. 5; and for this case, both the cluster pairs 304, 306 and 306, 308 with merge potential pass the filtering step. A third condition may then be applied to determine which pairs to actually merge. In this regard, the minimum distance between $P_{kl}$ and each of the points in cluster $C_k$ may be determined, $D_{kl} = \min_t (f_D(P_{lk}, C_{ki}))$. If $D_{kl} < R_{nn}$, $C_{kl}$ may be merged into a single cluster and added to the set of merged pairs, $M_{pairs}$; and $C_k$ and $C_l$ may be removed from C. An example of this is shown in FIG. 6; and the global GNN clusters 302, 304, 306 in which local clusters 306, 308 are merged are shown in FIG. 7.

Once every pair in $I_{pairs}$ has been tested, $M_{pairs}$ may be iterated over using the following pseudo-code:

While $M_{pairs}$ not empty:
    $C_i$ = Pop first cluster in $M_{pairs}$
    For each cluster remaining in $M_{pairs}$:
    $C_j$ = Pop first cluster in $M_{pairs}$
    If $C_i \cap C_j = \emptyset$, Then Append $C_j$ to the end of $M_{pairs}$

```
Else C_i = C_i ∪ C_j
Add C_i to C.
```

Figure 8:
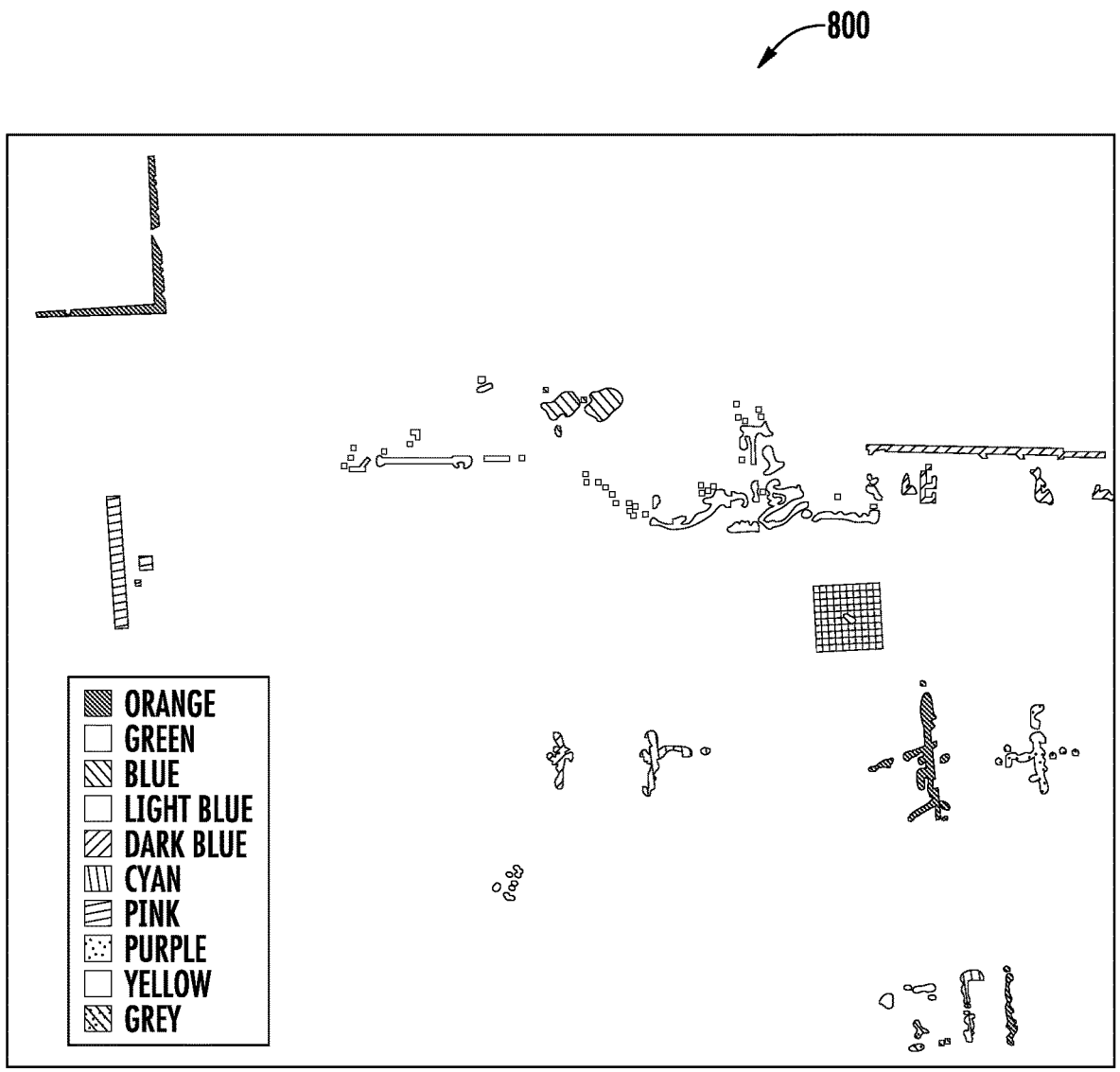
FIG. 8 illustrates GNN cluster analysis of points of an image of an airport, according to some example implementations.

The set of clusters, C, now contains the set of global GNN clusters and the algorithm is complete. FIG. 8 illustrates GNN cluster analysis of points of an image 800 of an airport, according to some example implementations FIGS. 9A-9E are flowcharts illustrating various steps in a method 900 according to various example implementations. The method includes receiving points of an image that are spatially arranged to represent objects depicted in the image, the points corresponding to pixels of a digital image, or data points of a point cloud, as shown at block 902 of FIG. 9A. The method includes performing a greedy nearest-neighbor (GNN) cluster analysis of the image to group the points of the image, as shown at block 904.

In some examples, the GNN cluster analysis includes grouping the points into a plurality of local GNN clusters, from a greedy analysis of the points using a k-d tree in which the points are organized in a k-dimensional space, as shown at block 906. The GNN cluster analysis also includes extending the plurality of local GNN clusters into a plurality of global GNN clusters, as shown at block 908. This includes for a pair of local GNN clusters, applying the pair to nested conditions by which similarity of the local GNN clusters is evaluated according to defined similarity criteria. The local GNN clusters are merged into a global GNN cluster when each of the defined similarity criteria is evaluated to true, and passed as global GNN clusters when any of the defined similarity criteria is evaluated to false.

The method 900 also includes detecting the objects depicted in the image based on the global GNN clusters, as shown at block 910.

Figure 9A:
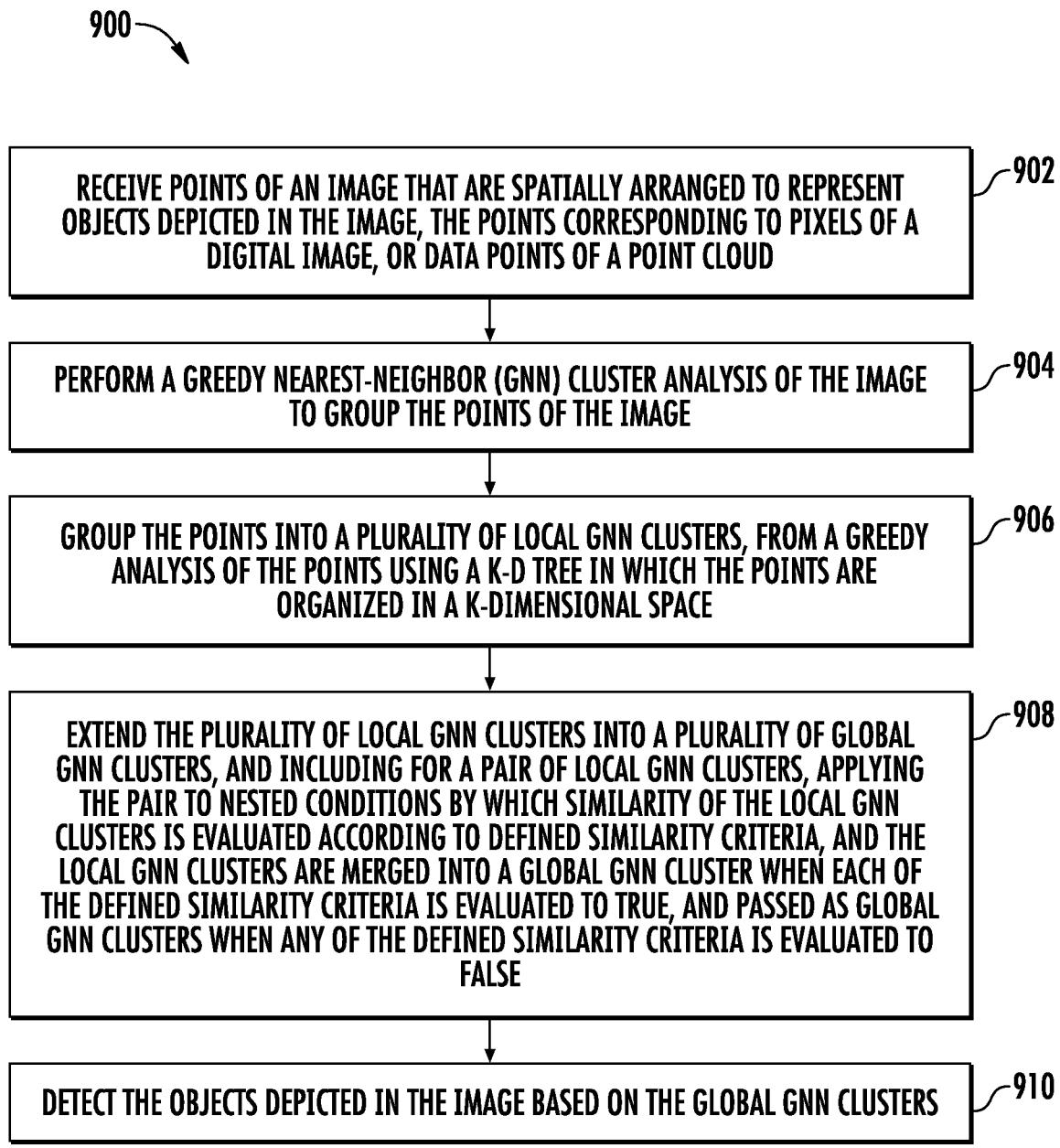
Figure 9B:
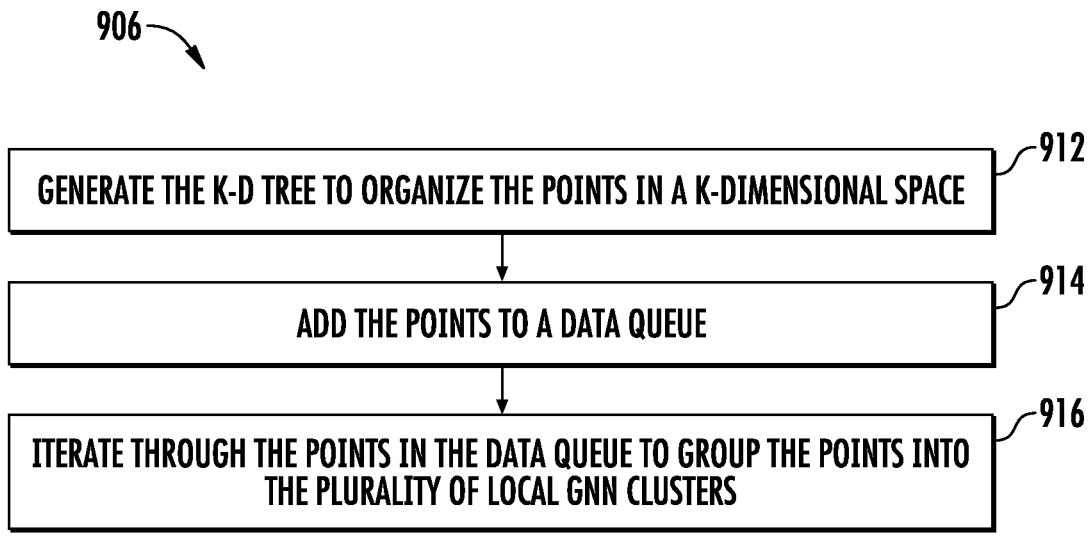

In some examples, grouping the points into the plurality of local GNN clusters at block 906 includes at least generating the k-d tree to organize the points in a k-dimensional space, as shown at block 912 of FIG. 9B. In some of these examples, the points are added to a data queue, and the points in the data queue are iterated through to group the points into the plurality of local GNN clusters, as shown at blocks 914 and 916.

Figure 9C:
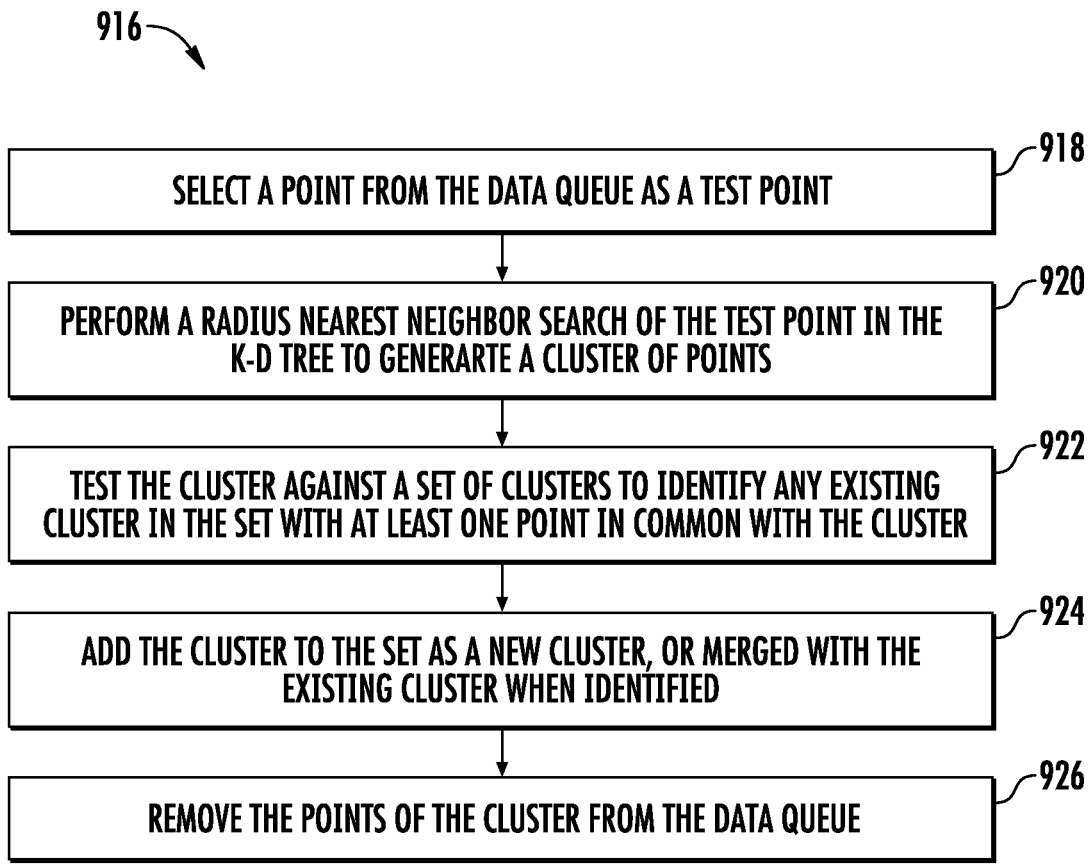

In some examples, iterating through the points in the data queue at block 916 includes for an iteration of a plurality of iterations, selecting a point from the data queue as a test point, as shown at block 918 of FIG. 9C. A radius nearest neighbor search of the test point is performed in the k-d tree to generate a cluster of points, as shown at block 920. The cluster is tested against a set of clusters to identify any existing cluster in the set with at least one point in common with the cluster, as shown at block 922. The cluster is added to the set as a new cluster, or merged with the existing cluster when identified, as shown at block 924. And the points of the cluster are removed from the data queue, as shown at block 926.

In some examples, the nested conditions include a first condition by which circumscribing hyperspheres of the local GNN clusters of the pair are evaluated to determine if a distance between the circumscribing hyperspheres is less than or equal to a distance threshold.

In some further examples, the nested conditions include a second condition by which a point in a first of the local GNN clusters that is closest to a centroid of a second of the local GNN clusters is evaluated to determine if the point is within a threshold distance of the centroid. In some of these examples the nested conditions also include a third condition by which a minimum distance between the point in the first of the local GNN clusters and respective points in the second of the local GNN clusters is evaluated to determine if the minimum distance is less than the threshold distance.

In some examples, extending the plurality of local GNN clusters at block 908 includes merging pairs of the local GNN clusters when each of the defined similarity criteria is evaluated true, and thereby producing a set of merged pairs of local GNN clusters, as shown at block 928 of FIG. 9D. In some of these examples, the set of merged pairs is iterated through to further merge any intersecting pair of the merged pairs into a respective global GNN cluster, as shown at block 930.

In some examples, the image depicts the objects in an ambient environment of a robot. In some of these examples, the method 900 further includes performing situational awareness of the robot based on the objects as detected, as shown at block 932 of FIG. 9E. The robot is then caused to execute maneuvers in the ambient environment based on the situational awareness, as shown at block 934.

According to example implementations of the present disclosure, the MMS 208 may be implemented by various means. Means for implementing the MMS may include hardware, alone or under direction of one or more computer programs from a computer-readable storage medium. In some examples, one or more apparatuses may be configured to function as or otherwise implement as shown and described herein. In examples involving more than one apparatus, the respective apparatuses may be connected to or otherwise in communication with one another in a number of different manners, such as directly or indirectly via a wired or wireless network or the like.

Figure 10:
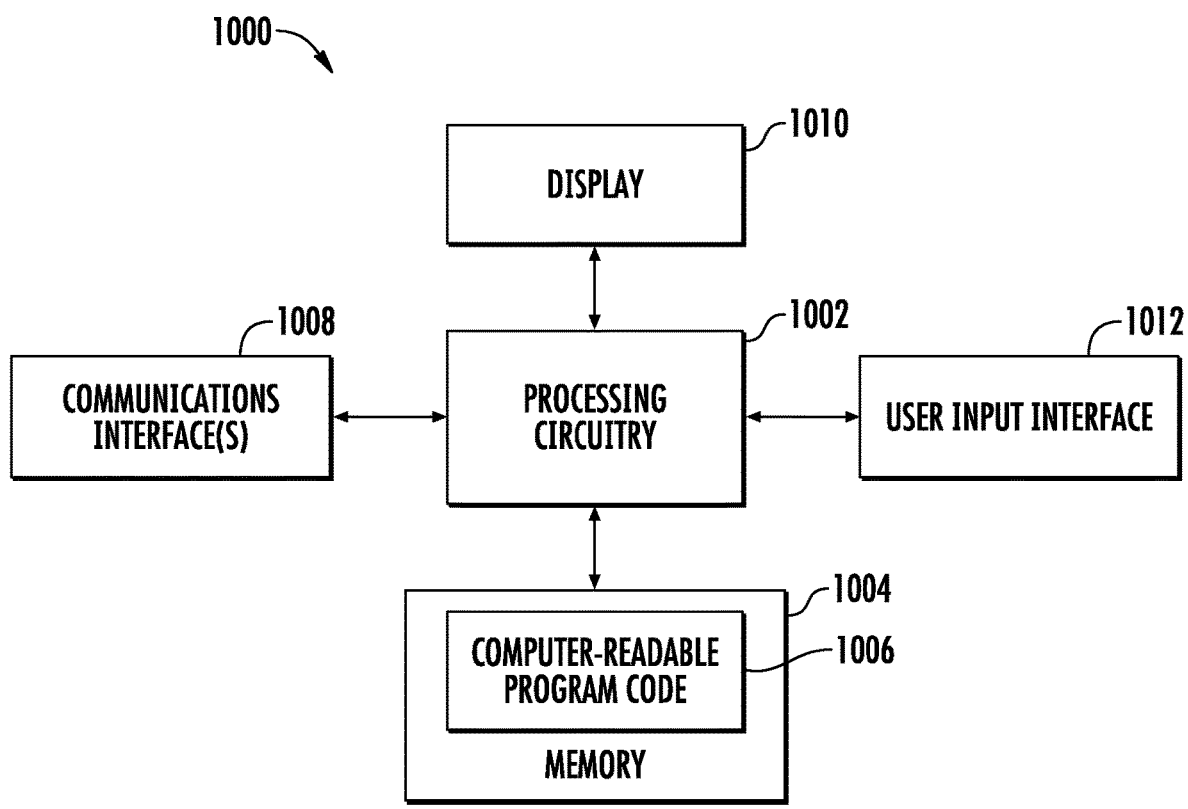
FIG. 10 illustrates an apparatus according to some example implementations.

FIG. 10 illustrates an apparatus 1000 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the subject disclosure includes, without limitation, the following example implementations.

Clause 1. A vehicle comprising: an imager configured to convey information from which an image of an ambient environment is generated, the information including points of the image that are spatially arranged to represent objects depicted in the image, the points corresponding to pixels of a digital image, or data points of a point cloud; and a mission management system (MMS) configured to at least: receive the points of the image; perform a greedy nearest-neighbor (GNN) cluster analysis of the image to group the points of the image, the GNN cluster analysis including the MMS configured to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

Clause 2. The vehicle of clause 1, wherein the MMS configured to group the points into the plurality of local GNN clusters includes the MMS configured to at least: generate the k-d tree to organize the points in a k-dimensional space; and add the points to a data queue; and iterate through the points in the data queue to group the points into the plurality of local GNN clusters.

Clause 3. The vehicle of clause 2, wherein the MMS configured to iterate through the points in the data queue includes for an iteration of a plurality of iterations, the MMS configured to: select a point from the data queue as a test point; perform a radius nearest neighbor search of the test point in the k-d tree to generate a cluster of points; test the cluster against a set of clusters to identify any existing cluster in the set with at least one point in common with the cluster; add the cluster to the set as a new cluster, or merged with the existing cluster when identified; and remove the points of the cluster from the data queue.

Clause 4. The vehicle of any of clauses 1 to 3, wherein the nested conditions include a first condition by which circumscribing hyperspheres of the local GNN clusters of the pair are evaluated to determine if a distance between the circumscribing hyperspheres is less than or equal to a distance threshold.

Clause 5. The vehicle of clause 4, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

Clause 6. The vehicle of any of clauses 1 to 5, wherein the MMS configured to extend the plurality of local GNN clusters includes the MMS configured to: merge pairs of the local GNN clusters when each of the defined similarity criteria is evaluated true, and thereby produce a set of merged pairs of local GNN clusters; and iterate through the set of merged pairs to further merge any intersecting pair of the merged pairs into a respective global GNN cluster.

Clause 7. The vehicle of any of clauses 1 to 6, wherein the image depicts the objects in the ambient environment of the vehicle, and the MMS is further configured to at least: perform situational awareness of the vehicle based on the objects as detected; and cause the vehicle to execute maneuvers in the ambient environment based on the situational awareness.

Clause 8. An apparatus comprising: a memory configured to store computer-readable program code; and processing circuitry configured to access the memory, and execute the computer-readable program code to cause the apparatus to at least: receive points of an image that are spatially arranged to represent objects depicted in the image, the points corresponding to pixels of a digital image, or data points of a point cloud; perform a greedy nearest-neighbor (GNN) cluster analysis of the image to group the points of the image, the GNN cluster analysis including the apparatus caused to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

Clause 9. The apparatus of clause 8, wherein the apparatus caused to group the points into the plurality of local GNN clusters includes the apparatus caused to at least: generate the k-d tree to organize the points in a k-dimensional space; and add the points to a data queue; and iterate through the points in the data queue to group the points into the plurality of local GNN clusters.

Clause 10. The apparatus of clause 9, wherein the apparatus caused to iterate through the points in the data queue includes for an iteration of a plurality of iterations, the apparatus caused to: select a point from the data queue as a test point; perform a radius nearest neighbor search of the test point in the k-d tree to generate a cluster of points; test the cluster against a set of clusters to identify any existing cluster in the set with at least one point in common with the cluster; add the cluster to the set as a new cluster, or merged with the existing cluster when identified; and remove the points of the cluster from the data queue.

Clause 11. The apparatus of any of clauses 8 to 10, wherein the nested conditions include a first condition by which circumscribing hyperspheres of the local GNN clusters of the pair are evaluated to determine if a distance between the circumscribing hyperspheres is less than or equal to a distance threshold.

Clause 12. The apparatus of clause 111, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

Clause 13. The apparatus of any of clauses 8 to 12, wherein the apparatus caused to extend the plurality of local GNN clusters includes the apparatus caused to: merge pairs of the local GNN clusters when each of the defined similarity criteria is evaluated true, and thereby produce a set of merged pairs of local GNN clusters; and iterate through the set of merged pairs to further merge any intersecting pair of the merged pairs into a respective global GNN cluster.

Clause 14. The apparatus of any of clauses 8 to 13, wherein the image depicts the objects in an ambient environment of a vehicle, and the processing circuitry is configured to execute the computer-readable program code to cause the apparatus to further at least: perform situational awareness of the vehicle based on the objects as detected; and cause the vehicle to execute maneuvers in the ambient environment based on the situational awareness.

Clause 15. A method comprising: receiving points of an image that are spatially arranged to represent objects depicted in the image, the points corresponding to pixels of a digital image, or data points of a point cloud; performing a greedy nearest-neighbor (GNN) cluster analysis of the image to group the points of the image, the GNN cluster analysis including: grouping the points into a plurality of local GNN clusters, from a greedy analysis of the points using a k-d tree in which the points are organized in a k-dimensional space; and extending the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detecting the objects depicted in the image based on the global GNN clusters.

Clause 16. The method of clause 15, wherein grouping the points into the plurality of local GNN clusters includes at least: generating the k-d tree to organize the points in a k-dimensional space; and adding the points to a data queue; and iterating through the points in the data queue to group the points into the plurality of local GNN clusters.

Clause 17. The method of clause 16, wherein iterating through the points in the data queue includes for an iteration of a plurality of iterations: selecting a point from the data queue as a test point; performing a radius nearest neighbor search of the test point in the k-d tree to generate a cluster of points; testing the cluster against a set of clusters to identify any existing cluster in the set with at least one point in common with the cluster; adding the cluster to the set as a new cluster, or merged with the existing cluster when identified; and removing the points of the cluster from the data queue.

Clause 18. The method of any of clauses 15 to 17, wherein the nested conditions include a first condition by which circumscribing hyperspheres of the local GNN clusters of the pair are evaluated to determine if a distance between the circumscribing hyperspheres is less than or equal to a distance threshold.

Clause 19. The method of clause 18, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

Clause 20. The method of any of clauses 15 to 19, wherein extending the plurality of local GNN clusters includes: merging pairs of the local GNN clusters when each of the defined similarity criteria is evaluated true, and thereby producing a set of merged pairs of local GNN clusters; and iterating through the set of merged pairs to further merge any intersecting pair of the merged pairs into a respective global GNN cluster.

Clause 21. The method of any of clauses 15 to 20, wherein the image depicts the objects in an ambient environment of a vehicle, and the method further comprises: performing situational awareness of the vehicle based on the objects as detected; and causing the vehicle to execute maneuvers in the ambient environment based on the situational awareness.

Clause 22. A computer-readable storage medium that is non-transitory and has computer-readable program code stored therein that, in response to execution by processing circuitry, causes an apparatus to at least: receive points of an image that are spatially arranged to represent objects depicted in the image, the points corresponding to pixels of a digital image, or data points of a point cloud; perform a greedy nearest-neighbor (GNN) cluster analysis of the image to group the points of the image, the GNN cluster analysis including the apparatus caused to: group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters.

Clause 23. The computer-readable storage medium of clause 22, wherein the apparatus caused to group the points into the plurality of local GNN clusters includes the apparatus caused to at least: generate the k-d tree to organize the points in a k-dimensional space; and add the points to a data queue; and iterate through the points in the data queue to group the points into the plurality of local GNN clusters.

Clause 24. The computer-readable storage medium of clause 23, wherein the apparatus caused to iterate through the points in the data queue includes for an iteration of a plurality of iterations, the apparatus caused to: select a point from the data queue as a test point; perform a radius nearest neighbor search of the test point in the k-d tree to generate a cluster of points; test the cluster against a set of clusters to identify any existing cluster in the set with at least one point in common with the cluster; add the cluster to the set as a new cluster, or merged with the existing cluster when identified; and remove the points of the cluster from the data queue.

Clause 25. The computer-readable storage medium of any of clauses 22 to 24, wherein the nested conditions include a first condition by which circumscribing hyperspheres of the local GNN clusters of the pair are evaluated to determine if a distance between the circumscribing hyperspheres is less than or equal to a distance threshold.

Clause 26. The computer-readable storage medium of clause 25, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

Clause 27. The computer-readable storage medium of clause 226, wherein the apparatus caused to extend the plurality of local GNN clusters includes the apparatus caused to: merge pairs of the local GNN clusters when each of the defined similarity criteria is evaluated true, and thereby produce a set of merged pairs of local GNN clusters; and iterate through the set of merged pairs to further merge any intersecting pair of the merged pairs into a respective global GNN cluster.

Clause 28. The computer-readable storage medium of any of clauses 22 to 27, wherein the image depicts the objects in an ambient environment of a vehicle, and the computer-readable storage medium has further computer-readable program code stored therein that, in response to execution by the processing circuitry, causes the apparatus to further at least: perform situational awareness of the vehicle based on the objects as detected; and cause the vehicle to execute maneuvers in the ambient environment based on the situational awareness.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A vehicle comprising:
an imager configured to convey information from which an image of an ambient environment is generated, the information including points of the image that are spatially arranged to represent objects depicted in the image, the points corresponding to pixels of a digital image, or data points of a point cloud; and
a mission management system (MMS) configured to at least:
receive the points of the image;
perform a greedy nearest-neighbor (GNN) cluster analysis of the image to group the points of the image, the GNN cluster analysis including the MMS configured to:
group the points into a plurality of local GNN clusters, from a greedy analysis of the points using a k-d tree in which the points are organized in a k-dimensional space; and
extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false;
detect the objects depicted in the image based on the global GNN clusters; and
wherein the MMS configured to group the points into the plurality of local GNN clusters includes the MMS configured to at least:
generate the k-d tree to organize the points in the k-dimensional space;
add the points to a data queue; and
iterate through the points in the data queue to group the points into the plurality of local GNN clusters.

2. The vehicle of claim 1, wherein the MMS configured to iterate through the points in the data queue includes for an iteration of a plurality of iterations, the MMS configured to:
select a point from the data queue as a test point;
perform a radius nearest neighbor search of the test point in the k-d tree to generate a cluster of points;
test the cluster against a set of clusters to identify any existing cluster in the set with at least one point in common with the cluster;
add the cluster to the set as a new cluster, or merged with the existing cluster when identified; and
remove the points of the cluster from the data queue.

3. The vehicle of claim 1, wherein the nested conditions include a first condition by which circumscribing hyperspheres of the local GNN clusters of the pair are evaluated to determine if a distance between the circumscribing hyperspheres is less than or equal to a distance threshold.

4. The vehicle of claim 3, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

5. The vehicle of claim 1, wherein the MMS configured to extend the plurality of local GNN clusters includes the MMS configured to:
merge pairs of the local GNN clusters when each of the defined similarity criteria is evaluated true, and thereby produce a set of merged pairs of local GNN clusters; and
iterate through the set of merged pairs to further merge any intersecting pair of the merged pairs into a respective global GNN cluster.

6. The vehicle of claim 1, wherein the image depicts the objects in the ambient environment of the vehicle, and the MMS is further configured to at least:
perform situational awareness of the vehicle based on the objects as detected; and
cause the vehicle to execute maneuvers in the ambient environment based on the situational awareness.

7. The vehicle of claim 1, wherein the vehicle is an aircraft.

8. An apparatus comprising:
a memory configured to store computer-readable program code; and
processing circuitry configured to access the memory, and execute the computer-readable program code to cause the apparatus to at least:
receive points of an image that are spatially arranged to represent objects depicted in the image, the points corresponding to pixels of a digital image, or data points of a point cloud;
perform a greedy nearest-neighbor (GNN) cluster analysis of the image to group the points of the image, the GNN cluster analysis including the apparatus caused to:
group the points into a plurality of local GNN clusters, from a greedy analysis of the points using a k-d tree in which the points are organized in a k-dimensional space; and
extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and
detect the objects depicted in the image based on the global GNN clusters; and
wherein the nested conditions include a first condition by which circumscribing hyperspheres of the local GNN clusters of the pair are evaluated to determine if a distance between the circumscribing hyperspheres is less than or equal to a distance threshold;
wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

9. The apparatus of claim 8, wherein the apparatus caused to group the points into the plurality of local GNN clusters includes the apparatus caused to at least:
generate the k-d tree to organize the points in the k-dimensional space; and
add the points to a data queue; and
iterate through the points in the data queue to group the points into the plurality of local GNN clusters.

10. The apparatus of claim 9, wherein the apparatus caused to iterate through the points in the data queue includes for an iteration of a plurality of iterations, the apparatus caused to:
select a point from the data queue as a test point;
perform a radius nearest neighbor search of the test point in the k-d tree to generate a cluster of points;
test the cluster against a set of clusters to identify any existing cluster in the set with at least one point in common with the cluster;
add the cluster to the set as a new cluster, or merged with the existing cluster when identified; and
remove the points of the cluster from the data queue.

11. The apparatus of claim 8, wherein the apparatus caused to extend the plurality of local GNN clusters includes the apparatus caused to:
merge pairs of the local GNN clusters when each of the defined similarity criteria is evaluated true, and thereby produce a set of merged pairs of local GNN clusters; and
iterate through the set of merged pairs to further merge any intersecting pair of the merged pairs into a respective global GNN cluster.

12. The apparatus of claim 8, wherein the image depicts the objects in an ambient environment of a vehicle, and the processing circuitry is configured to execute the computer-readable program code to cause the apparatus to further at least:
perform situational awareness of the vehicle based on the objects as detected; and
cause the vehicle to execute maneuvers in the ambient environment based on the situational awareness.

13. The apparatus of claim 8, wherein the apparatus is utilized with an aircraft.

14. A method comprising:
receiving points of an image that are spatially arranged to represent objects depicted in the image, the points corresponding to pixels of a digital image, or data points of a point cloud;
performing a greedy nearest-neighbor (GNN) cluster analysis of the image to group the points of the image, the GNN cluster analysis including:
grouping the points into a plurality of local GNN clusters, from a greedy analysis of the points using a k-d tree in which the points are organized in a k-dimensional space; and
extending the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and
detecting the objects depicted in the image based on the global GNN clusters; and
wherein extending the plurality of local GNN clusters includes:
merging pairs of the local GNN clusters when each of the defined similarity criteria is evaluated true, and thereby producing a set of merged pairs of local GNN clusters; and
iterating through the set of merged pairs to further merge any intersecting pair of the merged pairs into a respective global GNN cluster.

15. The method of claim 14, wherein grouping the points into the plurality of local GNN clusters includes at least:
generating the k-d tree to organize the points in the k-dimensional space; and
adding the points to a data queue; and
iterating through the points in the data queue to group the points into the plurality of local GNN clusters.

16. The method of claim 15, wherein iterating through the points in the data queue includes for an iteration of a plurality of iterations:
selecting a point from the data queue as a test point;
performing a radius nearest neighbor search of the test point in the k-d tree to generate a cluster of points;
testing the cluster against a set of clusters to identify any existing cluster in the set with at least one point in common with the cluster;
adding the cluster to the set as a new cluster, or merged with the existing cluster when identified; and
removing the points of the cluster from the data queue.

17. The method of claim 14, wherein the nested conditions include a first condition by which circumscribing hyperspheres of the local GNN clusters of the pair are evaluated to determine if a distance between the circumscribing hyperspheres is less than or equal to a distance threshold.

18. The method of claim 17, wherein the nested conditions include a second condition by which a point in a first of the local GNN clusters that is closest to a centroid of a second of the local GNN clusters is evaluated to determine if the point is within a threshold distance of the centroid, and a third condition by which a minimum distance between the point in the first of the local GNN clusters and respective points in the second of the local GNN clusters is evaluated to determine if the minimum distance is less than the threshold distance.

19. A computer-readable storage medium that is non-transitory and has computer-readable program code stored therein that, in response to execution by processing circuitry, causes an apparatus to at least:

receive points of an image that are spatially arranged to represent objects depicted in the image, the points corresponding to pixels of a digital image, or data points of a point cloud;

perform a greedy nearest-neighbor (GNN) cluster analysis of the image to group the points of the image, the GNN cluster analysis including the apparatus caused to:

group the points into a plurality of local GNN clusters, from a greedy analysis of the points using a k-d tree in which the points are organized in a k-dimensional space; and extend the plurality of local GNN clusters into a plurality of global GNN clusters, and including for a pair of local GNN clusters, applying the pair to nested conditions by which similarity of the local GNN clusters is evaluated according to defined similarity criteria, and the local GNN clusters are merged into a global GNN cluster when each of the defined similarity criteria is evaluated to true, and passed as global GNN clusters when any of the defined similarity criteria is evaluated to false; and detect the objects depicted in the image based on the global GNN clusters; and wherein the apparatus caused to extend the plurality of local GNN clusters includes the apparatus caused to:

merge pairs of the local GNN clusters when each of the defined similarity criteria is evaluated true, and thereby produce a set of merged pairs of local GNN clusters; and iterate through the set of merged pairs to further merge any intersecting pair of the merged pairs into a respective global GNN cluster.

20. The computer-readable storage medium of claim 19, wherein the apparatus caused to group the points into the plurality of local GNN clusters includes the apparatus caused to at least:

generate the k-d tree to organize the points in the k-dimensional space;

add the points to a data queue; and iterate through the points in the data queue to group the points into the plurality of local GNN clusters.

21. The computer-readable storage medium of claim 19, wherein the apparatus is utilized with an aircraft.

\* \* \* \* \*